(12) United States Patent
Balakrishnan et al.

(10) Patent No.: US 8,776,223 B2
(45) Date of Patent: Jul. 8, 2014

(54) DYNAMIC EXECUTION PREVENTION TO INHIBIT RETURN-ORIENTED PROGRAMMING

(75) Inventors: Arun Balakrishnan, San Diego, CA (US); Alexander Gantman, Poway, CA (US); Renwei Ge, San Diego, CA (US); Daniel Komaromy, San Diego, CA (US); Yinian Mao, San Diego, CA (US); Anand Palanigounder, San Diego, CA (US); Brian M. Rosenberg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 13/351,006

(22) Filed: Jan. 16, 2012

(65) Prior Publication Data
US 2013/0185792 A1    Jul. 18, 2013

(51) Int. Cl.
*G06F 21/00* (2013.01)
(52) U.S. Cl.
USPC ............................... 726/22; 726/23; 713/188
(58) Field of Classification Search
USPC ............................ 726/22–25; 713/187–189
See application file for complete search history.

(56) References Cited

U.S. PATENT DOCUMENTS

| 7,287,283 | B1 | 10/2007 | Szor |
| 7,475,220 | B1 | 1/2009 | Hastings |
| 7,540,026 | B1 | 5/2009 | Szor et al. |
| 2003/0088515 | A1* | 5/2003 | Cooper et al. ................... 705/50 |
| 2007/0198777 | A1* | 8/2007 | Reinertsen .................... 711/118 |
| 2008/0133858 | A1 | 6/2008 | Enbody et al. |
| 2009/0158012 | A1* | 6/2009 | Hansen et al. ................ 712/222 |
| 2009/0183261 | A1* | 7/2009 | Peinado et al. ................. 726/24 |
| 2009/0222923 | A1 | 9/2009 | Dixon |
| 2010/0031360 | A1 | 2/2010 | Seshadri et al. |
| 2011/0138476 | A1 | 6/2011 | Black et al. |
| 2011/0314460 | A1* | 12/2011 | Wischik et al. ............... 717/151 |
| 2011/0320681 | A1* | 12/2011 | Borntraeger et al. ............ 711/6 |
| 2011/0321165 | A1* | 12/2011 | Capalik et al. .................. 726/25 |
| 2012/0304160 | A1* | 11/2012 | Soeder ......................... 717/148 |
| 2012/0331303 | A1* | 12/2012 | Andersson et al. ........... 713/189 |

OTHER PUBLICATIONS

International Search Report and Written Opinion—PCT/US2013/021591—ISA/EPO—Apr. 3, 2013.

(Continued)

*Primary Examiner* — Edward Zee
*Assistant Examiner* — Chi Nguy
(74) *Attorney, Agent, or Firm* — Won Tae Kim

(57) ABSTRACT

A method, apparatus, and/or system for execution prevention is provided. A state indicator for a first subset of a plurality of memory pages of executable code in a memory device is set to a non-executable state. A state indicator for a second subset of the plurality of memory pages is set to an executable state, where the second subset of the plurality of memory pages includes indirection stubs to functions in the first subset of the plurality of memory pages. Upon execution of an application, a function call is directed to a corresponding indirection stub in the second subset of the plurality of memory pages which modifies the state indicator for a corresponding function in the first subset of the plurality of memory pages prior to directing execution of the called function from the first subset of the plurality of memory pages.

40 Claims, 13 Drawing Sheets

(56) References Cited

OTHER PUBLICATIONS

Kc et al., "e-NeXSh: Achieving an Effectively Non-Executable Stack and Heap via system-Call Policing", 21st Annual Computer Security Applications Conference [Online] See pp. 7, 9, and 11, (2005).

Tan et al.,"Buffer Overflow Protection Based on Adjusting Code Segment Limit"< IEEE International Symposium on Communications and Information Technology [Online] , vol. 2, pp. 916-919 (2005).

* cited by examiner

DYNAMIC EXECUTION PREVENTION TO INHIBIT RETURN-ORIENTED PROGRAMMING

BACKGROUND

1. Field

One feature generally relates to inhibiting operation of malicious code in software systems, and more particularly, to methods and devices that implement execution prevention and mark memory pages as non-executable by default so as to reduce the number of instructions available to return-oriented programming exploitations in software systems.

2. Background

Computing systems executing software are under a growing array of attacks. Such attacks often insert malicious code into a computing system, and then cause the computing system to execute the malicious code. The malicious code may perform many different operations, such as, cause the computing system to run slower than normal, monitor activity on the computing system, cause the computing system to transmit or receive information that a user may not want communicated, corrupt data in persistent and non-persistent memory, and crash the computing system.

Recently, attack mechanisms sometimes called Return-Oriented Programming (ROP) exploits have been proposed. One class of ROP exploit is often referred to as a return-to-libc attack (or return-into-libc attack). A return-to-libc (or return-into-libc) attack may be identified by two attributes: (a) it uses a standard C library resident in many software systems, and (b) it jumps directly to the entry point of a libc function, not inside it. An ROP exploit is a powerful technique that allows the attacker to exploit valid code sequences in software programs without injecting any new malicious code into the processor's address space. By exploiting some bug or weakness, an attack may gain control over the next memory address from which to execute an instruction. In one example, this can happen by overwriting a return address saved on the stack. For instance, such attack may utilize buffer overflows to specify return addresses to legitimate code blocks on the stack, which have the desired effect when legitimate functions return. Other ways of attacking an instruction pointer and/or obtaining control over the next memory address are also possible. Small snippets of valid code sequences, often referred to as gadgets, may be found by the attacker, then strung together to form new malicious code sequences, thereby sidestepping defenses against code injection.

In traditional ROP exploits, the small code snippets are portions of code that end with a return or jump instruction, for example. Other instructions may also be used as gadget terminating instructions. When a function is called, an address of the instruction after the call is pushed onto a stack as an address to return to after the called function completes. Thus, the stack may include many return addresses for the processor to jump to when called functions complete. If the attack can write information to the stack, it can overwrite an intended return address with a malicious return address. This return address may correspond to one of the gadgets identified by the attack.

By manipulating multiple return addresses, the attack controlling the call stack can chain multiple gadgets together to create a malicious code sequence without ever injecting any new code into the processors address space. Through a choice of these malicious code sequences and their arrangement, the attack can induce arbitrary behavior for a malicious program composed of the string of gadgets. This type of attack is successful because in most systems code and data addresses are predictable. That is, attacks can load particular code in a first computer, view the stack of the first computer to determine how the code is being loaded, and use this information to exploit the return stack when such code is loaded in a second (target) computer. Such attack may generally rely on code being loaded the same way across different computers.

Therefore, there is a need for robust counter-measures that can inhibit return-oriented programming attacks.

SUMMARY

Embodiments of the present disclosure include apparatuses, methods, and computer readable for inhibiting exploitation of vulnerabilities in stacks and/or memory.

A method operational in a processing circuit is provided to thwart return oriented attacks by execution prevention of executable code. A state indicator for a first subset of a plurality of memory pages of executable code in a memory device may be set to a non-executable state. For instance, this state indicator may serve to perform execution prevention of executable code residing in the first subset of the plurality of memory pages. Similarly, the state indicator for a second subset of the plurality of memory pages may be set to an executable state, where the second subset of the plurality of memory pages includes indirection stubs to functions in the first subset of the plurality of memory pages. Note that the plurality of memory pages of executable code may be loaded into the memory device before and/or after the state indicator for at least one of the first subset or second subset of the plurality of memory pages has been set to the non-executable state. The memory device into which the executable code resides may implement a virtual memory. A function call is then directed to a corresponding indirection stub in the second subset of the plurality of memory pages which modifies the state indicator for a corresponding function in the first subset of the plurality of memory pages prior to directing execution of the called function from the first subset of the plurality of memory pages. The indirection stub may modify the state indicator for the corresponding function in the first subset of the plurality of memory pages from the non-executable state to the executable state to enable execution of the function. Upon completion of the function call, the method may return to the corresponding indirection stub in the second subset of the plurality of memory pages, where the corresponding indirection stub then modifies the state indicator for the corresponding function in the first subset of the plurality of memory pages. The indirection stub may then modify the state indicator for the corresponding function in the first subset of the plurality of memory pages from the executable state to the non-executable state to disable execution of the function.

In one example, performing execution prevention may include aborting execution of any executable code which resides in a memory page that is in the non-executable state when the executable code is fetched by the processing circuit for execution.

In one example, the first instruction may be part of the function call and the second instruction an initial instruction of the corresponding function. The indirection stub may be implemented by binding the first instruction to the second instruction such that execution is aborted unless the first instruction is followed by the second instruction.

The executable code may correspond to a single application and/or process. In some implementations, the method may also include flushing an internal cache memory of the processing circuit upon completion of the function call. In some implementations, the indirection stubs may be generated at a compiling stage or pre-compiling stage of the executable code.

According to one example, code for the function may reside in a first memory page within the first subset of the plurality of memory pages. Usage of the first memory page that is in the executable state may be tracked to ascertain when all ongoing function calls have completed execution of corresponding code within the first memory page. The state indicator for the first memory page is then set to non-executable state upon completion of a last ongoing function call.

A processing device comprising a memory device and a processing circuit may also be provided. The processing circuit may be configured to: (a) set a state indicator for a first subset of a plurality of memory pages of executable code in the memory device to a non-executable state; (b) set the state indicator for a second subset of the plurality of memory pages to an executable state, where the second subset of the plurality of memory pages includes indirection stubs to functions in the first subset of the plurality of memory pages; and/or (c) direct a function call to a corresponding indirection stub in the second subset of the plurality of memory pages which modifies the state indicator for a corresponding function in the first subset of the plurality of memory pages prior to directing execution of the called function from the first subset of the plurality of memory pages.

According to another aspect, the corresponding indirection stub may include at least a first instruction and a second instruction that are restricted to being executed in sequence by the processing circuit. If the first instruction is followed by any instruction other than the second instruction then execution of the function call is aborted.

Another method operational in a processing circuit is provided. An application source code is generated including a plurality of functions. An indirection code for each function in the source code is also obtained and/or generated. Instructions may be added to cause the source code to be identified as non-executable when loaded into memory. Instructions may also be added to cause the indirection code to be identified as executable when loaded into memory. The source code and indirection code may be transformed at the processing circuit to generate an executable code. The executable code may correspond to a single application and/or process. The indirection stubs may be generated at the compiling stage or a pre-compiling stage of the executable code. The source code and indirection code may be compiled so that they reside in separate memory pages when loaded into memory. In one example, a first indirection code may cause a memory state indicator for a corresponding first function to be switched from a non-executable state to an executable state when the first function in invoked for execution. In another example, a first indirection code may cause a memory state indicator for a corresponding first function to be switched from an executable state to a non-executable state when the first function terminates execution. In yet another example, a first indirection code associated with a first function may be adapted to point to the first function, wherein when the executable code is generated, the first indirection code and first function are compiled to be loaded in different memory pages.

According to one aspect, the indirection code may include at least a first instruction and a second instruction that is restricted to being executed in sequence by a processing circuit. The method may further comprise adding instructions to cause aborting execution of the indirection code if the first instruction is followed by any instruction other than the second instruction.

DRAWINGS

DETAILED DESCRIPTION

Figure 1:
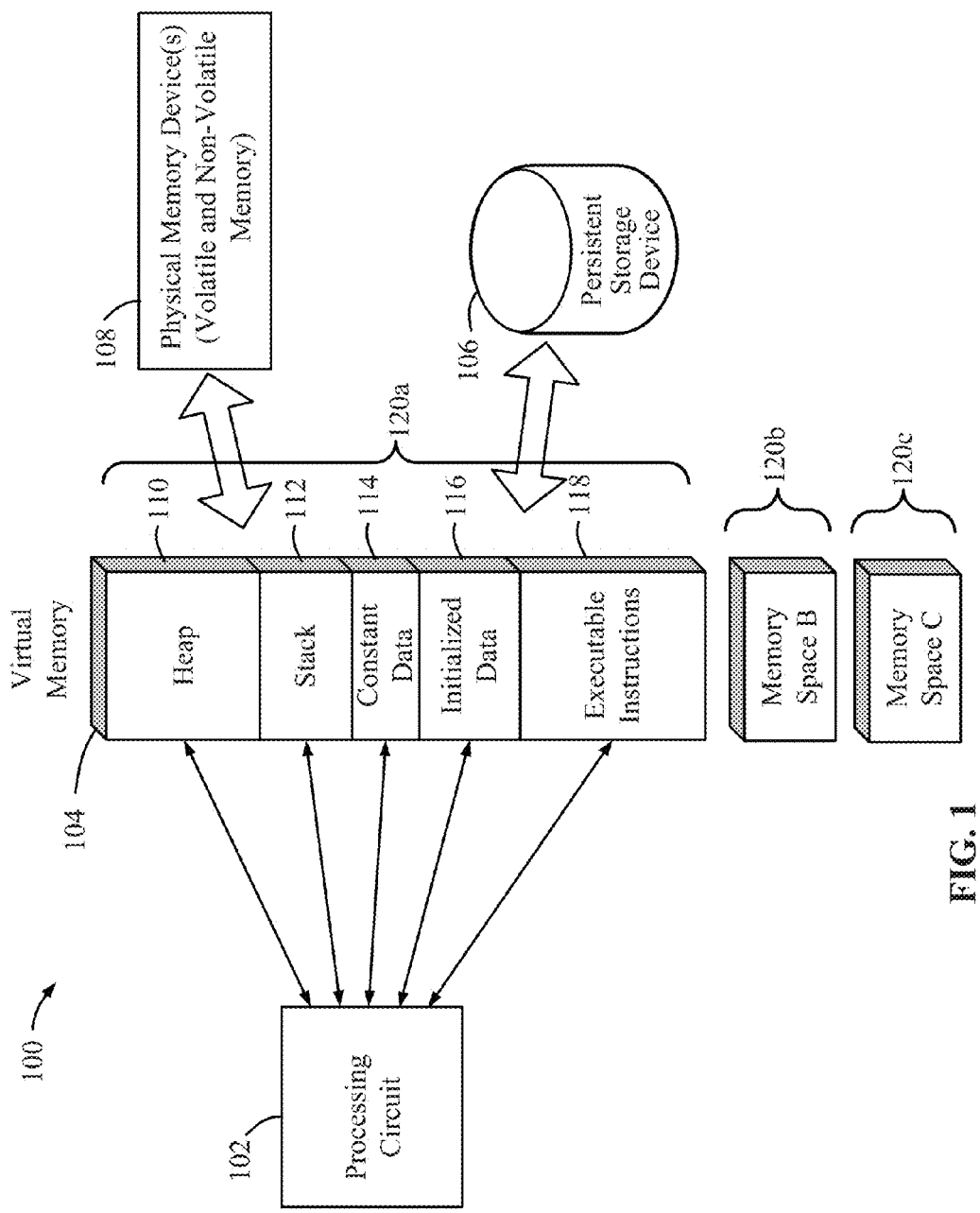
FIG. 1 is a block diagram illustrating an exemplary operating environment, device, and/or system in which one or more features for inhibiting ROP attacks may be implemented.

In the following description, reference is made to the accompanying drawings in which is shown, by way of illustration, specific embodiments in which the disclosure may be practiced. The embodiments are intended to describe aspects of the disclosure in sufficient detail to enable those skilled in the art to practice the invention. Other embodiments may be utilized and changes may be made to the disclosed embodiments without departing from the scope of the disclosure. The following detailed description is not to be taken in a limiting sense, and the scope of the present invention is defined only by the appended claims.

The term "data" may be used herein interchangeably to refer to computing instructions that may be used by a processor and data that may be operated on by the processor. The context of the use of the term "data" should make it clear when "data" is referring to instructions. Where needed, instructions may be referred to explicitly as instructions or instruction data.

Overview

The present disclosure refers to apparatuses, methods, and machine-readable for inhibiting exploitation of vulnerabilities in memory stacks by marking both executable and non-executable memory pages as "non-executable" by default while not in use. Therefore, a processing circuit may implement execution prevention on functions/instructions in memory pages marked "non-executable", thus inhibiting calls for instructions from ROP attack from being executed.

According to one feature, an indirection layer is implemented where all function calls to executable code are redirected first to a stub code that changes the memory state where such executable code resides. The stub code may change the memory state of a memory region where such executable code resides from a default "non-executable" state to an "executable" state. The stub code then points to the actual executable code. In one example, such feature may be implemented in source code of an application and/or when compiling such application into an executable. That is, the indirection layer (e.g., stub code) may be generated natively within the source code and/or it may be generated at compile time.

According to one aspect, a processing circuit may implement execution prevention of code/instructions found in "non-executable" memory pages. Memory pages containing executable instructions are initially loaded into memory and all pages (except those where stub code for the indirection layer reside) are marked as "non-executable" by default. Function calls initiated from legitimate applications operating on the processing circuit pass through the indirection layer (i.e., stub code) that changes the state of a memory page from "non-executable" to "executable" prior to, or concurrent with, retrieving and/or executing instructions/code from such memory page(s). Prior to execution of an instruction/code, the processing circuit may check and/or ascertain that it originates in memory page marked "executable". Calls from an ROP attack bypass the indirection layer (stub codes). Thus, an ROP attack attempting to use instructions (e.g., gadgets) from memory pages marked "non-executable" would fail since the processing circuit would prevent or abort their execution.

According to yet another aspect, the indirection code may include at least a first instruction and a second instruction that is restricted to being executed in sequence by a processing circuit. If the first instruction is followed by any instruction other than the second instruction then execution of the function call is aborted. In one exemplary implementation, this aspect may avoid the need for additional instructions to implement a separate indirection layer. Instead, when the paired corresponding instructions (e.g., first instruction and second instruction) are used, they may cause the processor to switch a memory page between an executable and non-executable state and/or execute the code that follows. In some implementations, because the first and second instructions are bound to be executed in sequence, there may be no need to switch between the executable and non-executable state since the processor aborts all subsequent execution if anything other than the second instruction follows the first instruction.

Exemplary Operating Environment

FIG. 1 is a block diagram illustrating an exemplary operating environment, device, and/or system 100 in which one or more features for inhibiting ROP attacks may be implemented. The operating environment 100 may include a processing circuit 102 (e.g., one or more processors) coupled to one or more memory and/or storage devices. In one example, the operating environment 100 may implement a memory management technique known as virtual memory. Virtual memory is a technique developed for multitasking kernels. Virtual memory virtualizes various forms of data and/or executable code storage, such as random-access memory and disk storage, allowing a program to be designed as though there is only one kind of memory, "virtual" memory, which behaves as directly addressable read/write memory (RAM). Many operating systems that support virtual memory may also run each process in its own dedicated address space (e.g., its own virtual memory), allowing a program or application to be designed as though it has sole access to the virtual memory. For instance, a plurality of dedicated address spaces 120a, 102b, 120c are shown here, where each of these address spaces may be associated with a difference process, program, and/or application.

In this example, the virtual memory 104 is representative of an addressable memory space within one or more physical memory devices 108 and/or a persistent storage device 106. The processing circuit 102 may be adapted to access the virtual memory 104 (or memory addresses mapped by the virtual memory) to read in executable instructions in the form of code and/or data that is loaded in the physical memory device(s) 108 and/or the persistent storage device 106.

According to one example, the virtual memory 104 may be arranged into a heap 110, a stack 112, constant data 114, initialized data 116, and executable instructions 118. The heap 110 may be used for dynamic allocation for various software programs while they may be active within the processing environment 100. Various data, such as constant data 114 and initialized data 116 may be stored in the main memory device 104 for access by one or more programs running on the processing environment 100. Executable instructions 118 associated with various programs may be stored in an instruction area 118, the heap 110, or combinations thereof.

Unless otherwise specifically noted, the term "memory" is used hereinafter to refer to virtual memory and/or any other addressable memory space from where executable instructions and/or data are accessed (e.g., read from and/or written to) by the processing circuit 102. The concepts described herein operate in various types of memory architectures. For example, virtual memory may be implemented in a memory device (e.g., main memory) external to the processing circuit 102 and/or it may be implemented in a memory device (e.g., an internal cache memory) within the processing circuit 102.

According to one feature, data execution prevention is implemented by the processing circuit 102 to help prevent return-oriented programming attacks. According to one aspect, prior to execution, executable instructions may be loaded into virtual memory 104, along with corresponding indirection code (stubs) that the processing circuit 102 may use when executing code. The processing circuit 102 may then read instructions/data from, and/or write instructions/data to, the virtual memory 104.

In this feature, all (or most) memory pages where the executable code resides may be marked as non-executable as they are loaded (or mapped) into virtual memory 104 by default. An NX bit, which stands for "No eXecute", may be used by some processing circuits to segregate areas of memory for use by either storage of instructions (or code) or for storage of data. An operating system (running on the processing circuit 102), with support for the NX bit, may mark all areas of virtual memory 104 where the executable code resides as non-executable. In one example, areas of virtual memory 104 where indirection code (stubs) resides may be may be marked as executable. This indirection code (stubs) may be inserted in source code or generated at compile time of the application. Function calls from the application may call (or may be redirected to) the indirection code, which changes the memory state between "non-executable" and "executable", and then directs execution to a corresponding portion of the executable code.

Every time a memory page is loaded/fetched by the processing circuit 102 from the virtual memory 104, the indirection layer (e.g., stub) operating within the processing circuit 102 changes the NX bit from "non-executable" to "executable" prior to (or concurrent with) loading/fetching. That is, when a function in a memory page is invoked by an application/program being executed by the processing circuit 102, the memory page is changed (by an indirection layer) from "non-executable" to "executable" by the indirection layer. If the memory page is already marked "executable (i.e., the memory page has been previously switched from non-executable to executable), then the indirection layer need not change NX bit to non-executable.

The processing circuit 102 may include an execution prevention module that blocks execution of any code residing in memory pages marked "non-executable" in virtual memory 104. Upon finishing execution of the desired function(s), the memory page where the corresponding executable code resides in virtual memory 104 may be switched from "executable" back to "non-executable".

An ROP attack attempting to access instructions from memory pages in virtual memory that are marked as "non-executable" would fail. By initializing all executable code (e.g., instructions) in those memory pages (e.g., areas in memory) as "non-executable" and only changing the status of those memory pages (e.g., areas, or segments) to "executable" when they are called/fetched by the processing circuit 102 via the indirection layer, an ROP attack is limited to calling instructions from those memory pages (in virtual memory 104) currently marked "executable". Calls from an ROP attack would bypass the indirection layer (stubs). Thus, an ROP attack attempting to use instructions (e.g., gadgets) from other memory pages (in virtual memory 104) would fail since those memory pages are marked "non-executable". Thus, upon retrieval of such "non-executable" pages, the execution prevention feature/module of the processing circuit 102 would prevent or reject execution of instructions in such memory pages. Marking all memory pages "non-executable" greatly reduces the number of memory pages from which the ROP attack can use instructions. To further reduce the "executable" instructions available to the ROP attack, once a function terminates, the corresponding memory page is set back to "non-executable" in virtual memory 104.

Note that execution prevention by using NX bits is typically done on an application stack and other memory regions/areas containing data. However, according to the present feature, memory regions or pages containing the legitimate executable instructions (e.g., code, functions, etc.) of an application are marked as non-executable.

Figure 2:
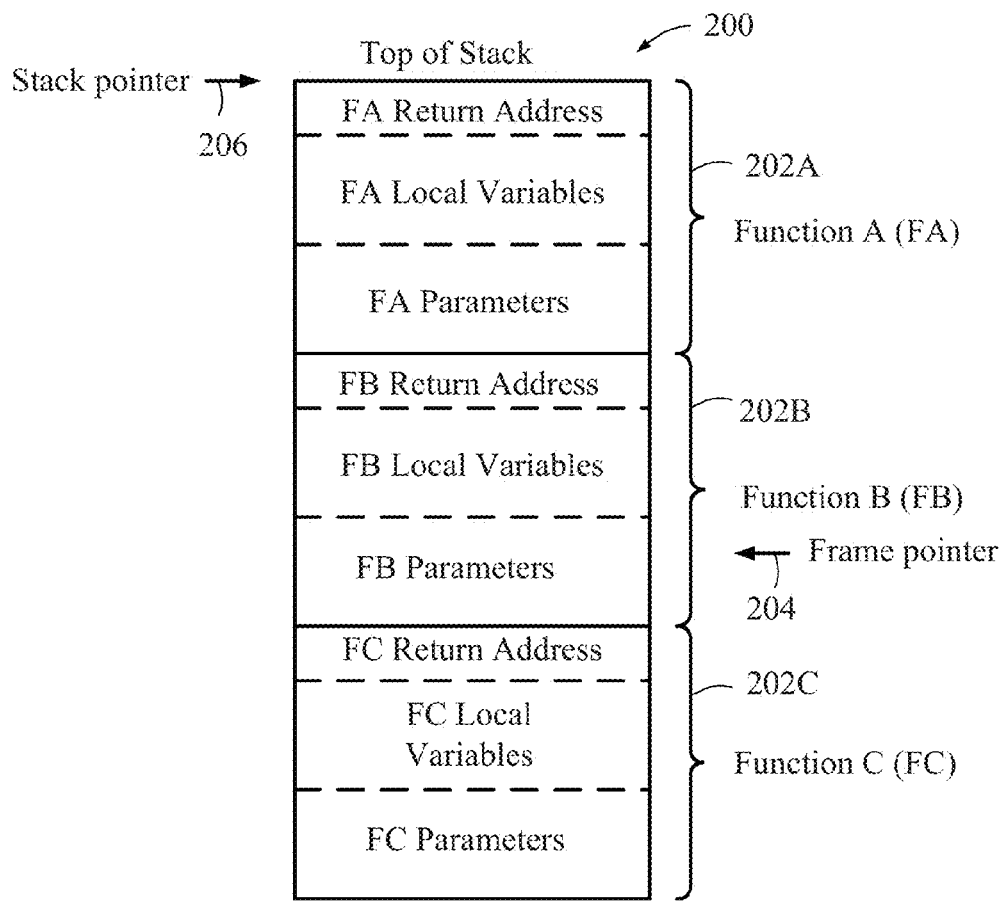
FIG. 2 illustrates an exemplary general call stack that may be implemented in memory.

FIG. 2 illustrates an exemplary general call stack 200 that may be implemented in memory. The call stack 200 may be used to store various information that may be used when a function is called. Each function that is pushed on the stack occupies a frame 202 as indicated by the frames 202A, 202B, and 202C for called functions A, B, and C, respectively.

As a non-limiting example, each frame 202 of the call stack 200 may include information such as parameters that are passed from the caller function to the called function. The call stack 200 may also include an area of memory for storing various local variables that may be used by the called program. A return address indicating where in the calling function execution should continue after the called function has completed execution may also be included in the call stack 200. The call stack 200 may operate as a Last In First Out (LIFO) buffer meaning that the last data pushed on the stack is the first data popped from the stack. The call stack 200 may be quite deep indicating that many function calls are nested within other functions.

A frame pointer 204 generally points to the frame 202 of the currently executed function. A stack pointer 206 points to the next position of data on the stack 200 that is available to be popped off and returned to a processor.

ROP exploits take advantage of the stack data structure by writing a malicious address to the return address portion of various frames 202A, 202B, and 202C. An attacker may examine code that would be resident in memory, such as, for example, the standard C library, or portions of the operating system. The attacker can then identify many of these gadgets (i.e., small code snippets) to create a library of ROP instructions. These ROP instructions may then be strung together to create a useful, unintended, and malicious code sequence without inserting any code into memory. Rather, the attacker only has to change return addresses on the call stack 200 to point to the start of the desired gadgets. Operations related to the call stack may thus be corrupted by ROP exploits. However, since gadgets used by such ROP exploits are retrieved by bypassing the indirection layer used by the processing circuit, these gadgets are likely to be found in memory pages marked "non-executable". Thus, the processing circuit would refuse or abort their execution.

Exemplary Processing Circuit with Data Execution Prevention

Figure 3:
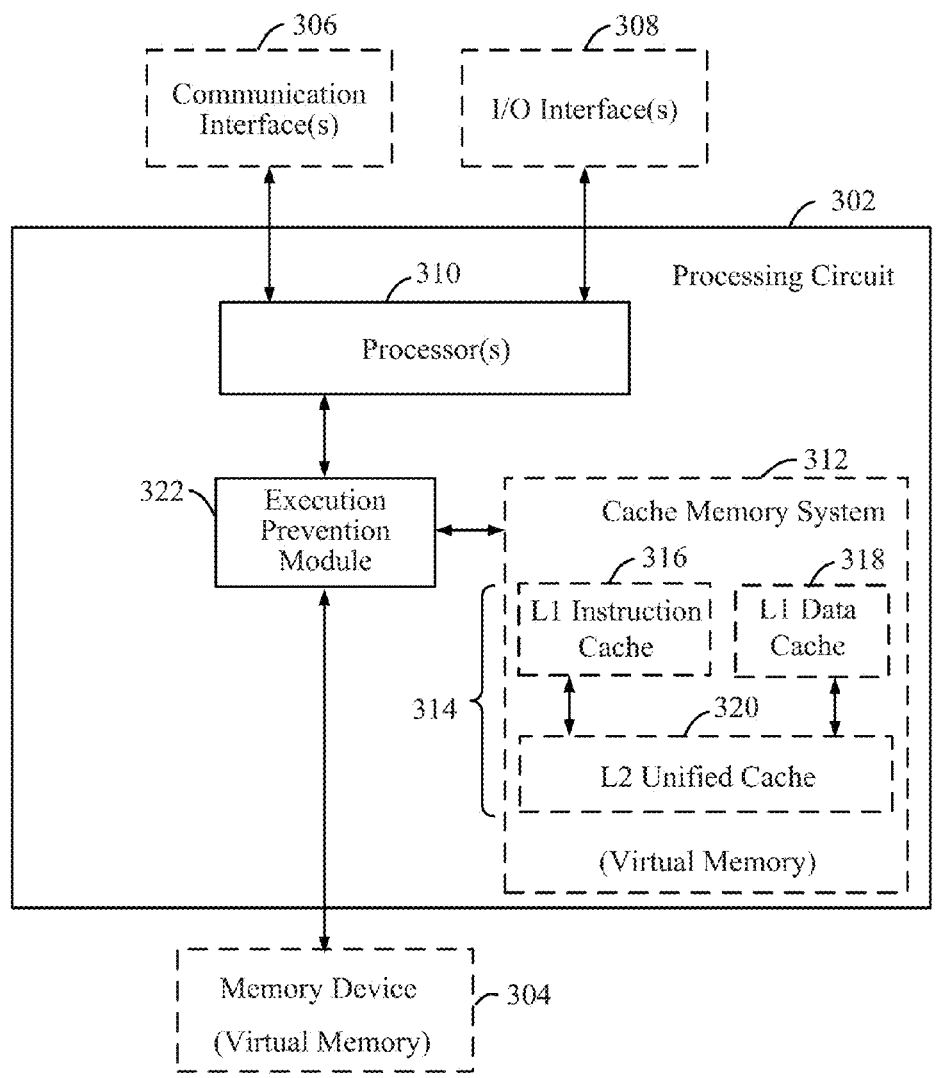
FIG. 3 illustrates an exemplary processing circuit that may be adapted to perform execution prevention by initially tagging all or most memory space where executable code resides as non-executable.

FIG. 3 illustrates an exemplary processing circuit 302 that may be adapted to perform execution prevention by initially tagging all or most memory space where executable code resides as non-executable. The processing circuit 302 may include one or more processors 310 and, optionally, a cache memory system 312. The processing circuit 302 may be coupled to external devices, such as a memory device 304, various communication interfaces 306, and/or one or more Input/Output (I/O) interfaces 308. As non-limiting examples, communication interfaces 306 may include interfaces for communication over a bus, cellular networks, serial ports, parallel ports, Ethernet connections, universal serial bus (USB) connections, IEEE 1394 ("firewire") connections, Bluetooth wireless connections, 802.1 a/b/g/n type wireless connections, and other suitable communication protocols and interfaces. As non-limiting examples, I/O interfaces 308 may include interfaces to devices such as keyboards, mice, trackballs, haptic devices, audio inputs and outputs, and displays.

Some cache memory systems 312 include a multi-level cache including two or more levels 314 of cache memory. In this example, a first level of cache may include a separate instruction cache 316 and a data cache 318. Separating instructions from data may create performance enhancements by creating parallel paths for fetching information and taking advantage of temporal and spatial proximity that may be different for instructions and data. A second level of cache may be configured as a unified cache 320 including both instructions for the instruction cache 316 and data for the data cache 318. In addition, the cache memory system 312 may include different configuration for the caches, such as, for example set-associative caches and various replacement protocols for caches that are full, as would be known by a person of ordinary skill in the art of cache design.

Caches allow faster retrieval of instructions and data relative to having to go to fetch such data and/or instructions from a main memory 304. The tradeoff compared to traditional memory is in size. In general, smaller memory has higher bandwidth, lower latency or a combination of both. The memory device 304 is typically implemented as Dynamic Random Access Memory (DRAM), which can have relatively good bandwidth, but can have relatively long latencies. By caching frequently used data and instructions in the cache memory system 312, fetches by the processor 312 can be received much more quickly and at a higher bandwidth. As a general rule, level 1 caches (i.e., caches closest to the processor 316 and 318) are smaller, faster, and have lower latency. Level 2 caches 320 are generally larger, may be slower, and may have longer latencies. However, they are still faster than the memory device 304 such that performance improvements are possible by including the second level of cache.

According to various examples of cache memory systems, one or more levels may be used and each level may be implemented as a unified cache or separate instruction caches and data caches. Embodiments discussed herein are mostly concerned with instructions. As a result, discussions may refer specifically to the instruction cache 316 and/or the unified cache 320. However, a person of ordinary skill in the art will appreciate that embodiments may be practiced on any level of cache and in both the instruction cache 316 and the unified cache 320.

Figure 4:
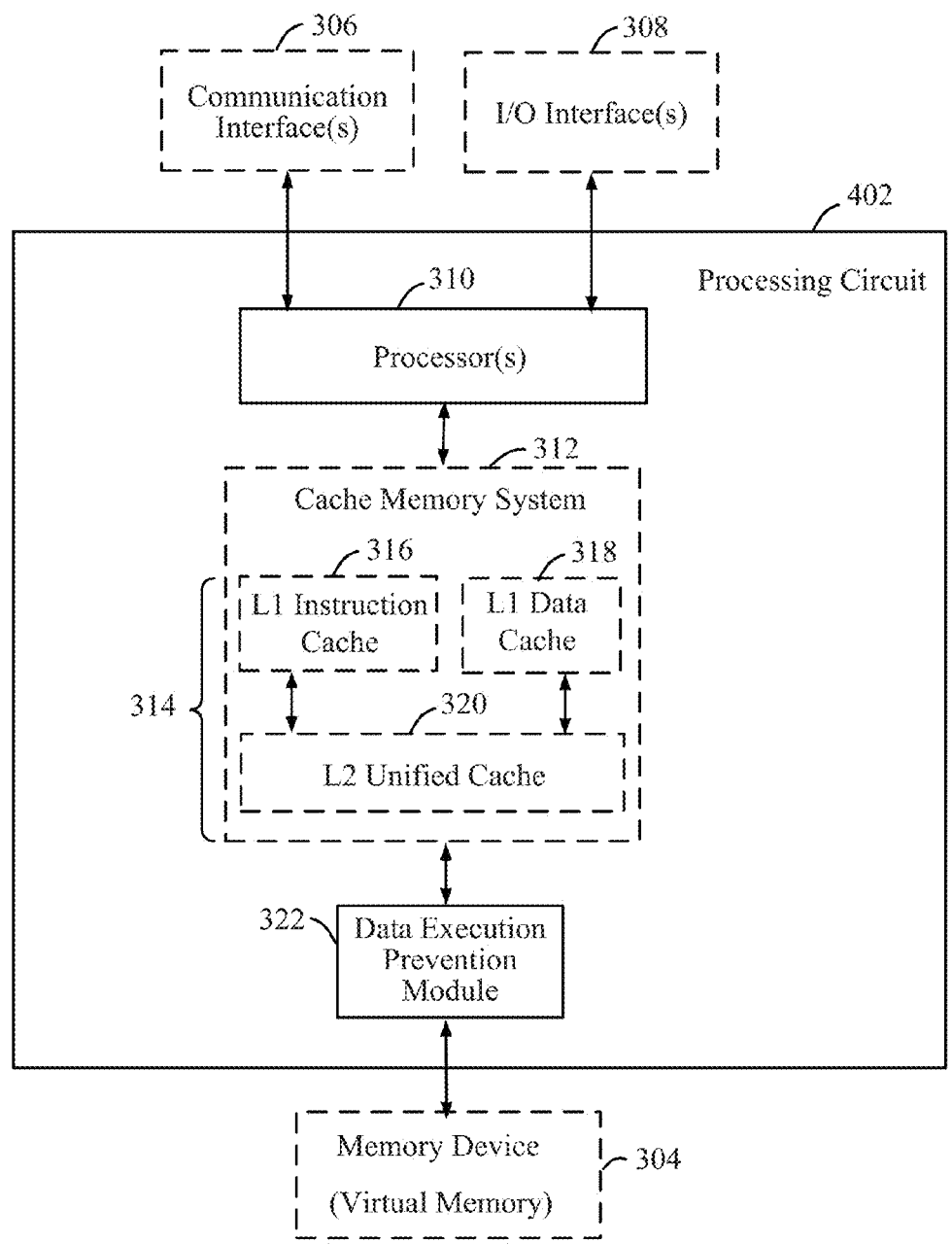
FIG. 4 illustrates an alternative configuration for an exemplary processing circuit in which the data execution prevention module is located between a cache memory system and a memory device.

According to one feature, the virtual memory used by the one or more processors 310 may reside within the cache memory system 312 (e.g., any level within the cache memory system) and/or within the memory device 304. The processing circuit 302 may also include or implement an execution prevention module 322. In this example, the execution prevention module 322 may be coupled between the processor(s) 310 and the memory device 304 and cache memory system 312. In this example, the virtual memory may be implemented on the memory device 304 and/or the cache memory system 312. FIG. 4 illustrates an alternative configuration for an exemplary processing circuit 402 in which the execution prevention module 322 is located between the cache memory system 312 and the memory device 304. In this example, the virtual memory may be implemented in the memory device 304.

According to one feature, all or most memory pages are initially marked as non-executable as they are fetched or mapped into virtual memory. The processing circuit 302 then refuses to execute any code residing in these areas marked "non-executable" in main memory 304. Instead, every time a page is loaded/fetched from the main memory 304 to the cache memory 312, the execution prevention module 322 changes (or causes to change) the NX bit from non-executable to executable prior to loading it into the cache memory 312. Once loaded into cache memory 312, the functions in that page may be executed.

An ROP attack attempting to access instructions from pages in virtual memory that are marked as "non-executable" would fail. By initializing all instructions pages as "non-executable" and only changing a memory page status to "executable" when it is fetched via the execution prevention module 322, an ROP attack is limited to calling instructions from those memory pages currently marked "executable". Note that while "memory pages" are used in many examples described herein, any memory unit, segment, region of equal or different sizes may be marked as "non-executable" and/or "executable". Because calls from an ROP attack bypass the data execution prevention module 322, the instructions (e.g., gadgets) they seek to execute would fail since those memory pages are marked "non-executable". Marking all memory pages in virtual memory as "non-executable" by default greatly reduces the number of memory pages from which the ROP attack can use instructions. To further reduce the "executable" instructions available to the ROP attack, once a function terminates, its corresponding memory page may be flushed from cache memory and/or it is set back to non-executable in virtual memory.

Figure 5:
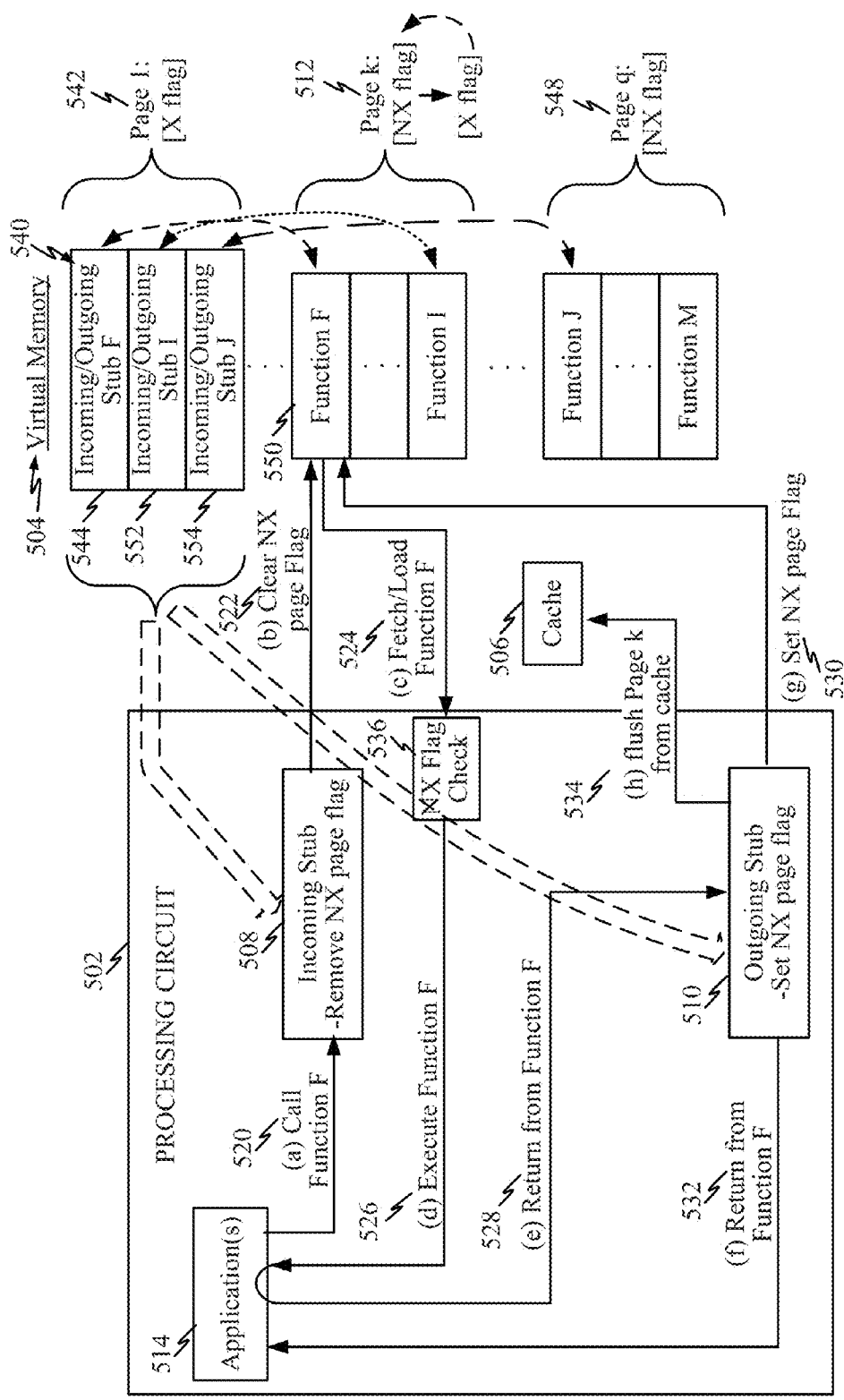
FIG. 5 is a block diagram illustrating an example of a processing circuit that is adapted to perform an enhanced data execution prevention feature.

FIG. 5 is a block diagram illustrating an example of a processing circuit that is adapted to perform an enhanced execution prevention feature. The processing circuit 502 may implement an indirection layer comprising an incoming stub 508 and/or an outgoing stub 510 along with a non-execute bit module 536 (denoted "NX Flag Check 536" in FIG. 5). In one example, the incoming stub 508 and/or outgoing stub 510 may be part of the application which gets loaded into memory. However, such incoming stub 508 and/or outgoing stub 510 may be loaded into a different region of memory that is marked "executable" (denoted by "X flag") while the corresponding executable code of the application may be loaded into memory regions marked "non-executable" (denoted by "NX flag") by default. In this example, the indirection stubs 540 are loaded into a first memory page 542 which has the NX flag set to executable by default. The corresponding executable code is loaded into memory pages k 512, and q 548. It can be appreciated here that each executable function has a corresponding incoming/outgoing stub. For instance, Function F in memory page k 512 has a corresponding incoming/outgoing stub F 544. Similarly, Function I in page k 512 has a corresponding incoming/outgoing stub I 552 and Function J in page q 548 has a corresponding incoming/outgoing stub J 554. In this example, the incoming stub 508 and outgoing stub 510 is a logical representation of the incoming/outgoing stub F 544.

According to one example, the stubs 508/510 may serve as an indirection layer and may be part of the application being executed by the processing circuit 502. The stubs 508/510 may serve to intercept function calls from/to the application 514 and/or may be specifically associated with one or more corresponding functions (executable code) of the application.

For purposes of illustration, the incoming stub 508 and the outgoing stub 510 are shown within the processing circuit 502 and serve to represent incoming/outgoing stubs loaded from virtual memory 504 (e.g., from memory page 1 542). Note that, depending on the number of function calls active/open at any one time, multiple incoming/outgoing stubs (e.g., from memory page 1 542) may be loaded by the processing circuit 502. The incoming stub 508 may serve to change the non-executable (NX) flag (usually a bit) for a memory page to an executable (X) flag, then transferring control to the called function within the memory page, and reversing the process (e.g., setting the memory page from executable (X) to non-executable (NX)) once the called function has been completed.

In the example illustrated in FIG. 5, upon executing an application 514 by the processing circuit, a call to a Function F 520 (where Function F 550 resides in memory page k 512 within virtual memory 504) may be made. Rather than fetching the called function (Function F) from the virtual memory 504 directly, the function call 520 is sent to the incoming stub 508 instead. For instance, upon the call to function F being invoked, the incoming stub F 544 is fetched and executed (e.g., illustrated as incoming stub 508). The incoming stub 508 (e.g., incoming stub F 544) causes a non-executable (NX) flag/bit to be cleared/removed 522 (i.e., set to executable (X) flag/bit set) from the memory page k 512 where Function F 550 resides prior to fetching and/or loading 524 of Function F 550 by the processing circuit 502. A non-execute (NX) flag checking module 536 may ascertain whether a memory page is marked as executable (X) or non-executable (NX) prior to loading and/or execution of Function F 550 by the processing circuit 502. Only instructions found in memory pages (or memory areas/segments) marked "executable" (X) in the virtual memory 504 are allowed to be executed by the processing circuit 502.

Once a memory page and/or instructions therein have been verified to be marked "executable" in virtual memory 504 and fetched into the processing circuit 502, these instructions may be executed normally by the processing circuit 502. Here, Function F 550 is executed 526 from the loaded memory page k 512. Upon finishing execution of Function F 550, the return 528 from Function F is sent to the outgoing stub 510 (i.e., outgoing stub F 544). The outgoing stub 510 may return execution control to the calling application 514. Additionally, the outgoing stub 510 may also set the non-executable (NX) page flag 530 (i.e., switch from executable state to non-executable state) for page k 512 in virtual memory 504 as well as flush 534 page k from any optional cache memory that may be used by the processing circuit 502. Flushing a page from cache memory 506 once a function call ends minimizes the number of executable instructions available for an ROP attack.

In an alternative implementation, an incoming stub may move a function/instruction into a memory page already marked as executable and then transfers control to the called function (e.g., calls the intended Function F). After the called function (e.g., Function F) has finished execution, the return is diverted to the outgoing stub 530 which reverses the previous operations (i.e., removes the function/instruction from the memory page already marked as executable and/or flushes any copy of memory page k 512 from cache).

The performance of this system may be improved by placing "caller" and "callee" functions on the same or nearby memory pages, setting and clearing the non-executable flag on a set or block of memory pages at a time, and/or switching between executable and non-executable states less frequently than every function entry and exit. For instance, if Function F calls Function M which calls Function P, it would be advantageous for these functions be located in the same memory page or block of pages that may be loaded or fetched together from virtual memory 504. Therefore, changing the non-execute (NX) page flag when Function F is invoked may also serve to make subsequently called Functions M and P executable without additional page loads and NX state changes.

ROP exploits generally have poor spatial proximity and poor temporal proximity, due to the nature of the short snippets of instructions (e.g., gadgets) that may be located in many different areas of memory that are not necessarily accessed often.

Figure 6:
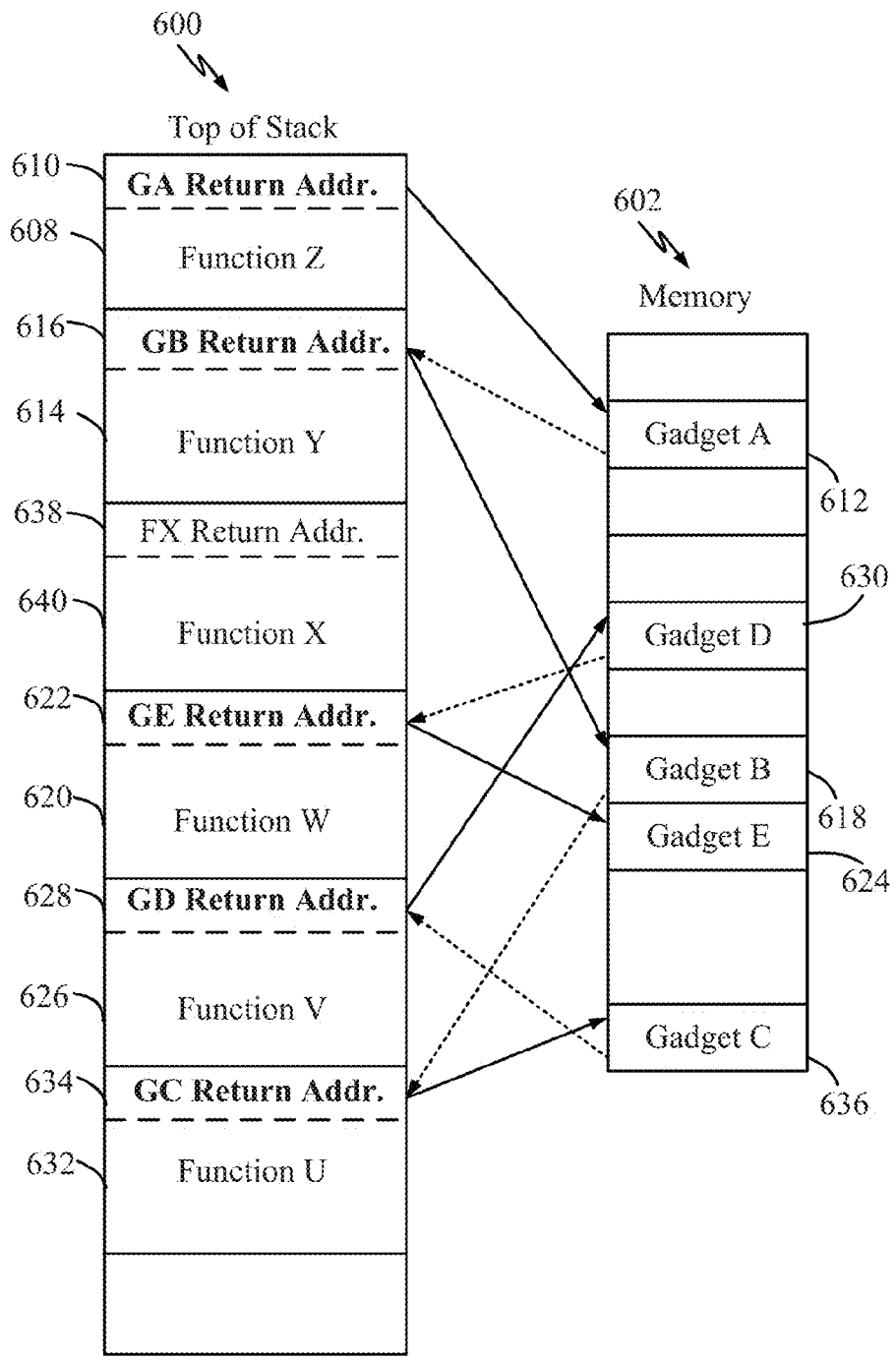
FIG. 6 illustrates an example of a corrupted call stack for generating a malicious code sequence including gadgets strung together to form a Return Oriented Programming (ROP) exploit.

FIG. 6 illustrates an example of a corrupted call stack 600 for generating a malicious code sequence including gadgets strung together to form a Return Oriented Programming (ROP) exploit. The corrupted call stack 600 is in a corrupted form due to an attacker modifying one or more of the return addresses on the corrupted call stack 600. Also illustrated in FIG. 6 are a portion of the memory 602 containing instructions.

The corrupted call stack 600 may include frames (function calls) for Functions U, V, W, X, Y and Z. Solid arrows from the corrupted call stack 600 to the memory 602 indicate return addresses popped off the stack causing the processing circuit to begin execution at the beginning of a particular gadget. Dashed arrows from the memory 602 to the corrupted call stack 600 indicate return instruction executed at the end of the particular gadget to fetch the return address from the stack.

In the corrupted call stack 600, the return address for Function Z 608 has been modified to point to a start address 610 (i.e., GA Return Address) of Gadget A 612. Similarly, the return address for Function Y 614 has been modified to point to a start address 616 (i.e., GB Return Address) of gadget B 618, the return address for function W 620 has been modified to point to a start address 622 (i.e., GE Return Address) of Gadget E 624, the return address for Function V 626 has been modified to point to a start address 628 (i.e., GD Return Address) of Gadget D 630, and the return address for Function U 632 has been modified to point to a start address 634 (i.e., GC Return Address) of Gadget C 636. In this example, the return address 638 for Function X 640 has not been modified.

Because of these modifications, when Function Z 608 completes its operation and the return instruction is performed, rather than return to the proper place, control continues at the beginning of Gadget A 612, for which the address has been placed in the return address 610 of Function Z 608. Every gadget ends with a return instruction. Thus, when Gadget A 612 is completed, its return instruction points to the return address 616 of Function Y 614. However, the return address 616 of Function Y 614 has been modified to point to the beginning of Gadget B 618. As a result, rather than return to the proper place, control continues at the beginning of Gadget B 618. Continuing with the gadget executions, after Gadget B 618 completes, rather than return to the proper place for Function U 632, control continues at the beginning of Gadget C 636. After Gadget C 636 completes, rather than return to the proper place for Function V 626, control continues at the beginning of Gadget D 630. After Gadget D 630 completes, rather than return to the proper place for Function W 620, control continues at the beginning of Gadget E 624. This stringing together of Gadgets A-E can perform significant functions forming at least a part of an ROP exploit.

However, because the processing circuits discussed herein utilize data execution prevention and all memory pages are in memory are marked as "non-executable" by default, only functions/instructions that have been called via the indirection layer (e.g., incoming stub 508 and outgoing stub 510) are guaranteed to reside on memory pages that are marked "executable". Consequently, any gadget that is located in a memory area marked as "non-executable" would fail to be executed by the processing circuit since such gadget calls bypass the indirection layer.

Figure 7:
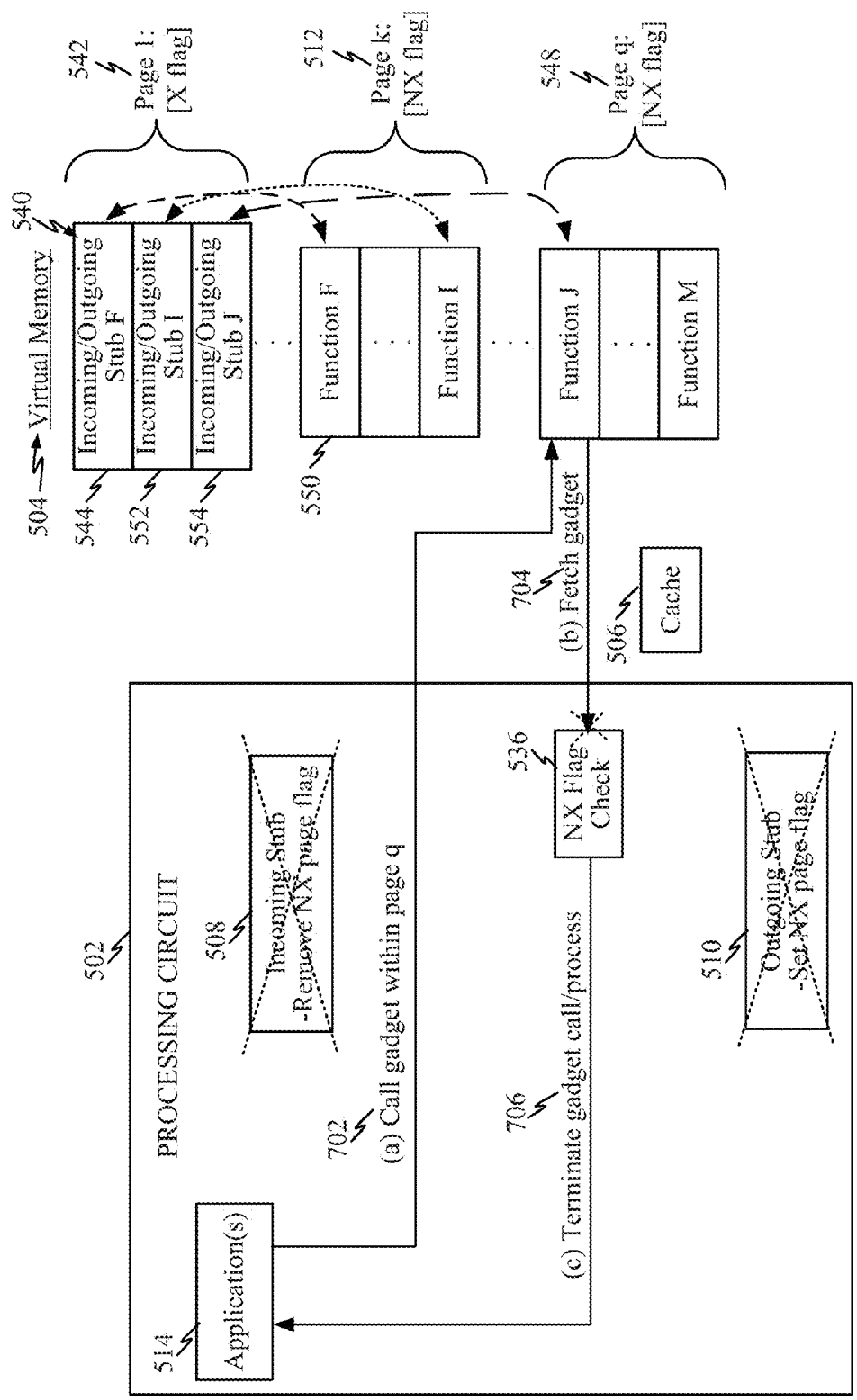
FIG. 7 is a block diagram illustrating what happens to a gadget fetch in the context of the processing unit of FIG. 5.

FIG. 7 is a block diagram illustrating what happens to a gadget fetch in the context of the processing unit of FIG. 5. In this example, various functions have been loaded into the virtual memory 504. The stack may have been hacked such that a call to load a gadget 702 from Page q 548 occurs. However, such gadget call 702 does not occur through the incoming stub 508. That is, unlike a function call which has a corresponding incoming/outgoing stub in virtual memory 504, a gadget call starts at an arbitrary point in memory (e.g., selected to achieve execution of certain instructions) without an incoming/outgoing stub. Consequently, since an incoming stub is not called, the state of page q 548 is still marked as "non-executable". When the gadget is fetched 704 from page q 548, the non-executable (NX) flag check module 536 rejects or blocks the loading of page q 548 since it is marked "non-executable". This may also cause termination of the gadget call and/or process 706.

Exemplary Methods for Inhibiting Execution within a Processing Circuit

Figure 8:
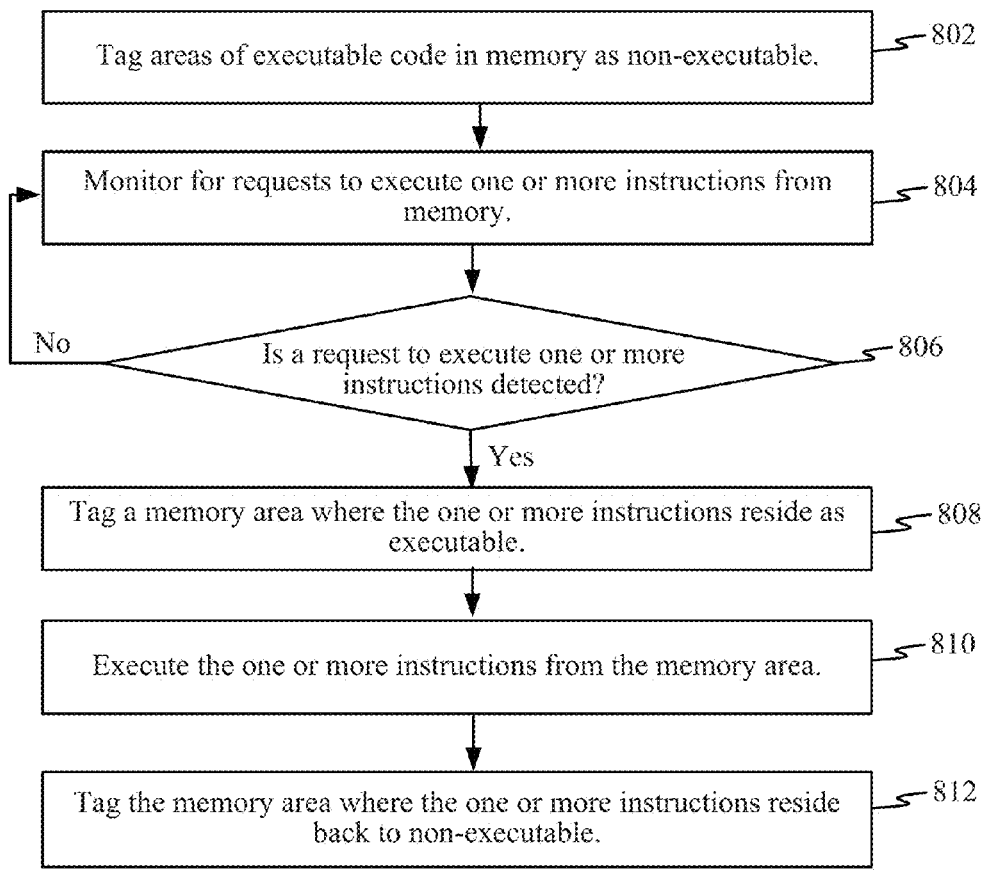
FIG. 8 is a flow diagram illustrating a general exemplary method for inhibiting execution of code in a processing circuit.

FIG. 8 is a flow diagram illustrating a general exemplary method for inhibiting execution of code in a processing circuit. This method may be implemented, for example, by a processing circuit that fetches instruction from memory (e.g., virtual memory, internal/external memory, etc.). Areas of executable code in memory are tagged (e.g., marked) as non-executable 802. The processing circuit may monitor for requests to execute one or more instructions from memory 804. If a request to execute one or more instructions detected 806, then a memory area where the one or more instructions reside is tagged as executable 808. The processing circuit may then execute the one or more instructions from the memory area 810. Upon completion, the memory area where the one or more instructions reside is tagged back to non-executable 812.

Figure 9:
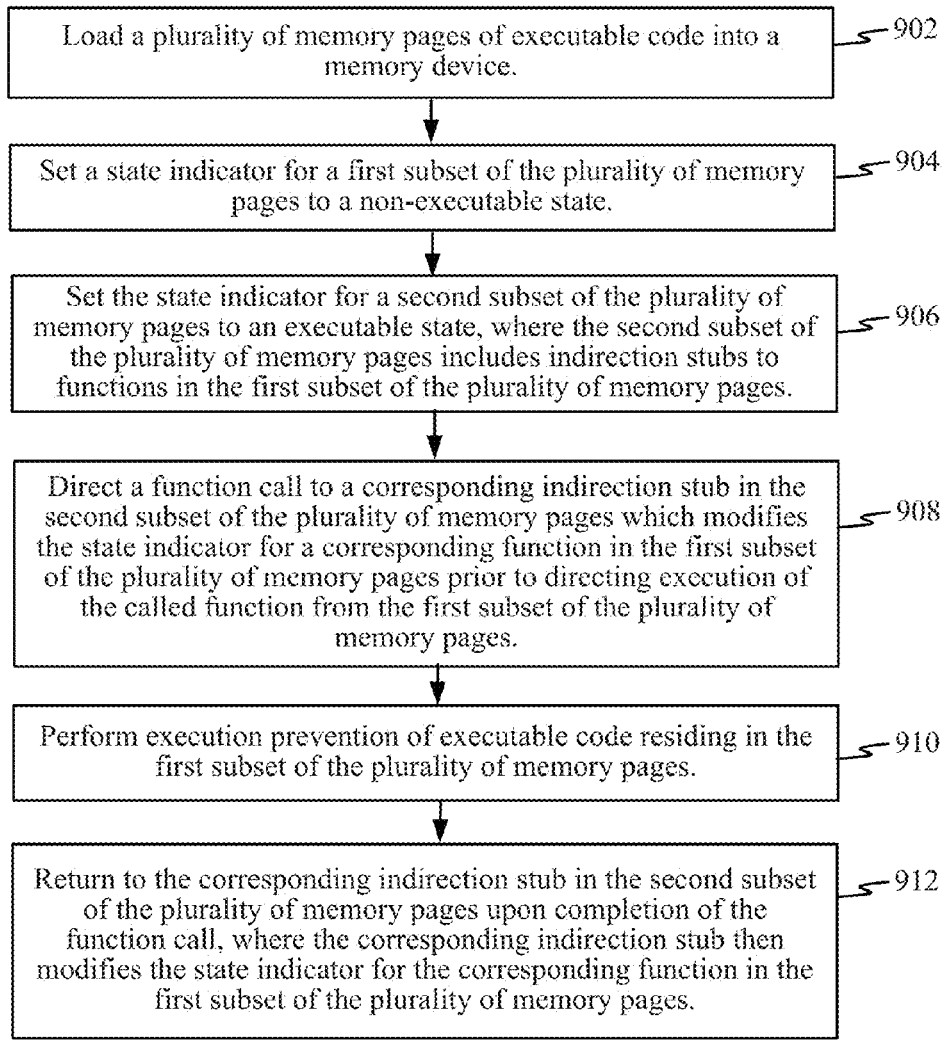
FIG. 9 is a flow diagram illustrating another exemplary method operational in a processing circuit, for protecting memory from ROP exploits.

FIG. 9 is a flow diagram illustrating another exemplary method operational in a processing circuit, for protecting memory from ROP exploits. This method may be implemented upon execution of an application or process by the processing circuit. The application or process may include instructions which cause its executable code to be loaded into memory and/or be protected in the following way. A plurality of memory pages of executable code may be loaded into a memory device 902. The executable code may correspond to a single application and/or process. The memory device into which the executable code is loaded may implement a virtual memory. A state indicator for a first subset of the plurality of memory pages may be set to a non-executable state 904. Likewise, the state indicator for a second subset of the plurality of memory pages is set to an executable state, where the second subset of the plurality of memory pages includes indirection stubs to functions in the first subset of the plurality of memory pages 906. Note that loading the plurality of memory pages of executable code into the memory device may occur before and/or after the state indicator for at least one of the first subset and/or second subset of the plurality of memory pages has been set to the non-executable state.

The indirection stubs may be generated at a compiling stage or pre-compiling stage of the executable code. Then, a function call may be directed to a corresponding indirection stub in the second subset of the plurality of memory pages which modifies the state indicator for a corresponding function in the first subset of the plurality of memory pages prior to directing execution of the called function from the first subset of the plurality of memory pages 908. The processing circuit may also perform execution prevention of executable code residing in the first subset of the plurality of memory pages 910. For instance, performing execution prevention may include aborting execution of any executable code which resides in a memory page that is in the non-executable state when the executable code is fetched by the processing circuit for execution. The processing circuit may also return to the corresponding indirection stub in the second subset of the plurality of memory pages upon completion of the function call, where the corresponding indirection stub then modifies the state indicator for the corresponding function in the first subset of the plurality of memory pages 912.

In one example, the indirection stub may modify the state indicator for the corresponding function in the first subset of the plurality of memory pages from the non-executable state to the executable state to enable execution of the function. The indirection stub may also modify the state indicator for the corresponding function in the first subset of the plurality of memory pages from the executable state to the non-executable state to disable execution of the function.

According to one aspect, an internal cache memory of the processing circuit may be flushed (cleared) of the function call upon completion of the function call. In another example, where code for the function call resides in a first memory page within the first subset of the plurality of memory pages, the method may further comprise: (a) tracking usage of the first memory page that is in the executable state; (b) ascertaining when all ongoing function calls have completed execution of corresponding code within the first memory page; and/or (c) setting the state indicator for the first memory page to non-executable state upon completion of a last ongoing function call.

Figure 10:
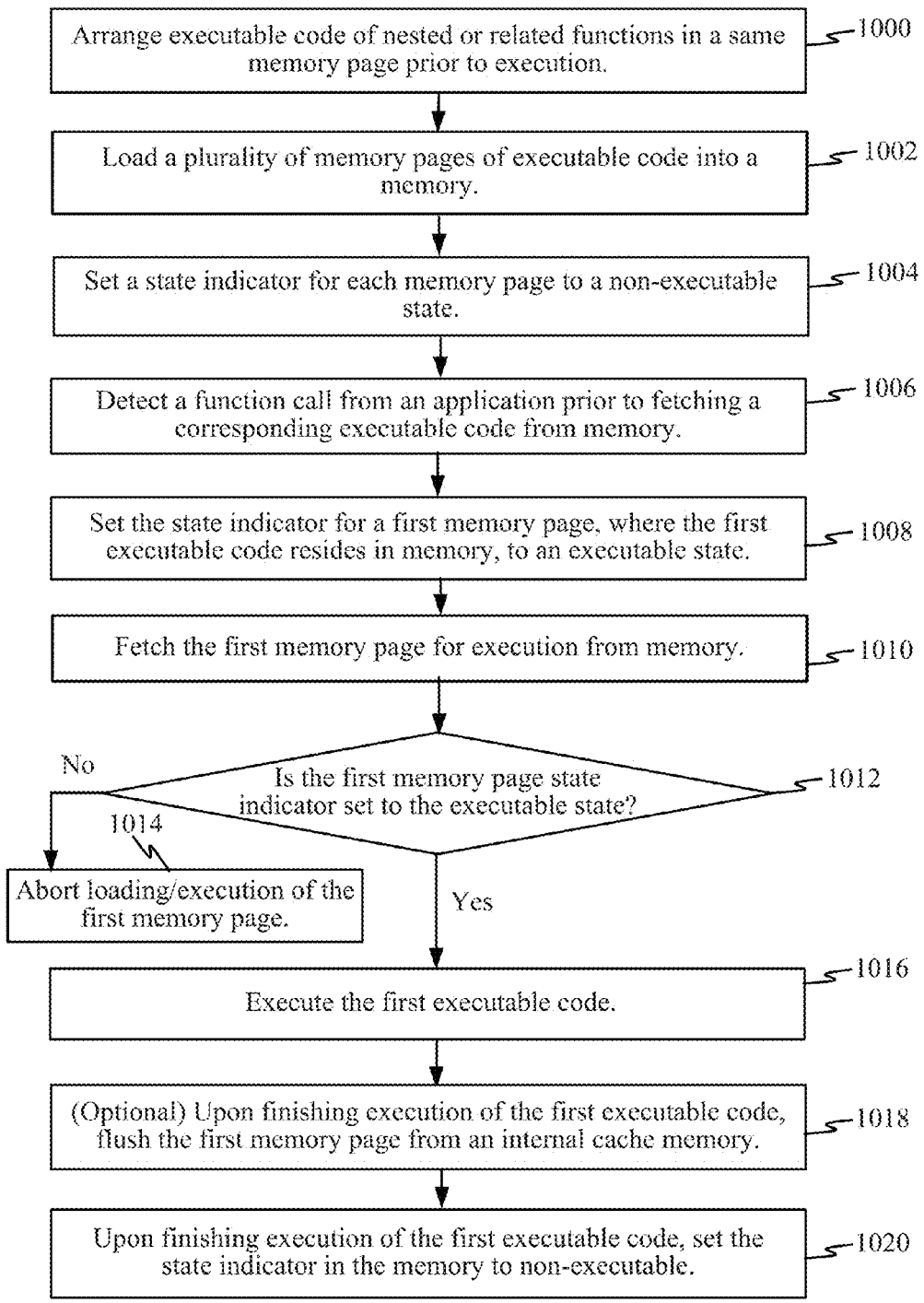
FIG. 10 is a flow diagram illustrating an exemplary method for protecting memory from ROP exploits.

FIG. 10 is a flow diagram illustrating an exemplary method for protecting memory from ROP exploits. This method may be operational in a processing circuit that accesses executable code or instructions from memory (e.g., virtual memory).

According to an optional feature, executable code of nested or related functions may be arranged in a same memory page prior to execution 1000. For instance, this arrangement may take place during compiling of the executable code or when loading executable code into the memory. Pre-arranging code in this manner may position related code closely together in memory, thereby avoiding excessive memory page fetches, and by extension, minimizing changes in page state (e.g., between executable and non-executable).

The processing circuit may load a plurality of memory pages of executable code into memory 1002 and set a state indicator for each memory page to a non-executable state 1004. In one example, such memory may be referred to as virtual memory, which may be a mapping of physical memory addresses of a main memory and/or cache memory device. Upon executing an application, the processing circuit and/or operating system may detect, monitor, and/or intersect a function call from the application prior to fetching a corresponding executable code from memory 1006. The state indicator for a first memory page, where the first executable code resides in memory, is set and/or changed to an executable state 1008. The first memory page may then be fetched from memory 1010. Prior to executing an instruction from the first memory page, a determination is made as to whether the first memory page state indicator set to the executable state 1012. If the memory page state is not the executable state, then loading/execution of the first memory page (by the processing circuit) is aborted 1014. Otherwise, if the first memory page state is in fact the executable state, the first executable code is executed 1016 (by the processing circuit). Upon finishing execution of the first executable code, the processing circuit may flush the first memory page from any internal cache memory (if present) 1018.

Additionally, the processing circuit may also set the state indicator in the memory back to non-executable 1020. In this manner, calls occurring from outside an application are not intercepted and their corresponding instructions would likely be found in memory pages having "non-executable" state.

In some implementations, there may be multiple nested calls to functions in one or more memory pages. According to one aspect, one or more counters may be maintained by the processing circuit executing application, where each counter serves to track whether execution of a function and/or instructions in a particular memory page has terminated. For instance, with nested function calls, where a function in a first memory page may call a function in a second page, multiple memory pages may remain open at the same time. The one or more counters may serve to track, for example, the number of entries into a particular memory page as well as the number of exits, thereby ascertaining when use of a memory page has been completed and can be flushed or changed back to "non-executable". In some implementations, a compiler may arrange related executable code together so that it resides in the same memory page(s). This permits executing instructions from a memory page without have to frequently clear and set the "non-executable" state of that memory page.

According to another aspect, boot-up code and/or certain startup operating system executable code may be excluded from the execution prevention feature described herein. That is, memory pages containing such code may be marked "executable" by default (rather than "non-executable"). This would permit quicker boot-up until a minimal operating functionality has been achieved at the processing circuit or operating system executed thereon.

Exemplary Indirection Layer

Figure 11:
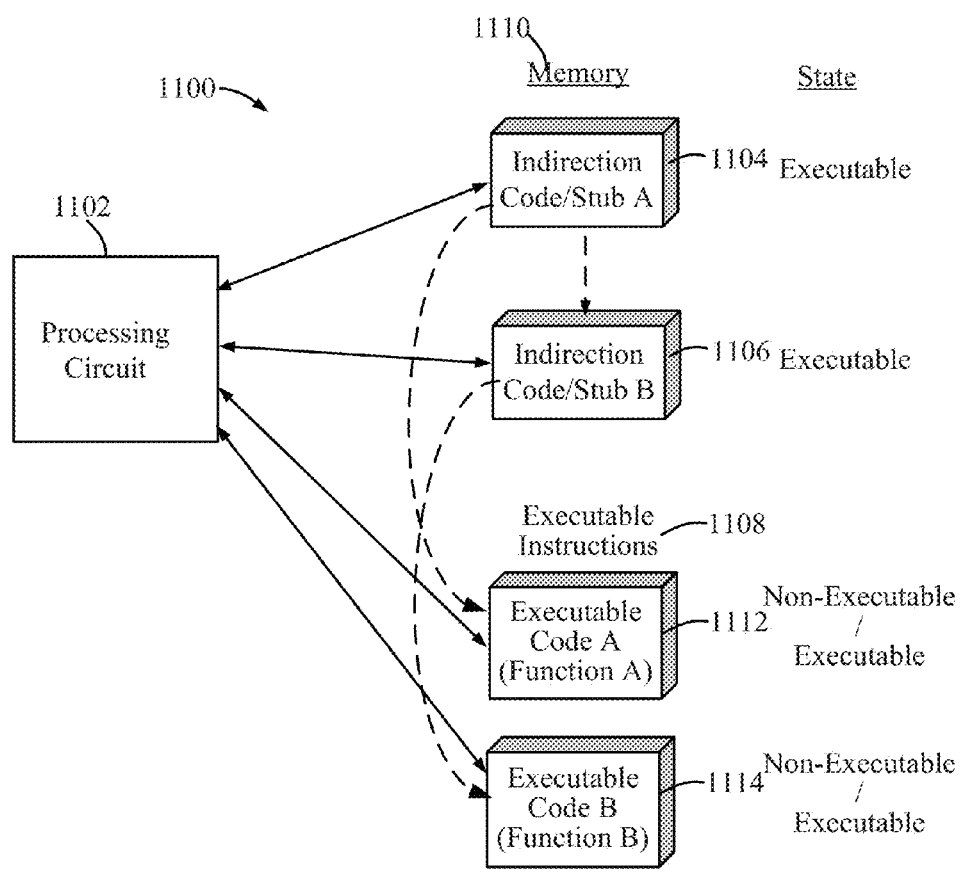
FIG. 11 is a block diagram illustrating an exemplary implementation of an indirection layer that permits modifying the state of memory areas as they are needed or called.

FIG. 11 is a block diagram illustrating an exemplary implementation of an indirection layer that permits modifying the state of memory areas as they are needed or called. In this example, a processing circuit 1102 may be coupled to a memory module 1110 (e.g., virtual memory, memory device, etc.) which includes executable instructions/code 1108 and/or corresponding indirection code 1104/1106 (i.e., indirection layer). In one example, the indirection code 1104/1106 may be separate instructions that have been specifically added or inserted (e.g., at pre-compiling, at compiling, and/or at post-compiling) into executable code. In another example, the indirection code 1104/1106 may be existing instructions that are configured/interpreted by a processor to achieve the desired functions of securing access to certain instructions residing in memory.

In one example, the indirection code 1104/1106 may serve to set/clear memory states for the executable instructions 1108. For instance, when a function A is called from within an application executed by the processing circuit, a corresponding indirection code A 1104 is actually called. The indirection code A 1104 sets the state of the corresponding memory region 1112 for the executable code A (function A) from "non-executable" to "executable" so the instructions can be executed by the processing circuit 1102. Upon completion of the instructions, the indirection code 1104 sets the state of the corresponding memory region 1112 for the executable code A (function A) from "executable" to "non-executable" so the instructions are not available for execution (e.g., by an ROP attach). The same process may be repeated for other functions. For instance, a second function B may have a corresponding indirection code B 1106 which is used to access the executable code B (function B) 1114.

In contrast to the memory space where the executable instructions 1108 reside (which is marked "non-executable" by default), the indirection code 1104 and/or 1106 may reside in a memory space that is marked "executable" so that the processing circuit 1102 can execute such code. The indirection code 1104 and/or 1106 may be generated at compile time of a particular application, where such indirection code is organized separately from the executable instructions. Alternatively, the indirection code 1104 and/or 1106 may be dynamically generated upon loading of the executable instructions 1108 into memory.

In one example, each executable code 1112/1114 (or function) may have a corresponding indirection code 1104/1106. Consequently, each indirection code (stub) 1104/1106 may know where its corresponding executable code 1112/1114 resides in memory and may be able to point to such memory address. Such memory address may be knowable at compile time (of the application) as well as the size of the executable code associated with each function. Consequently, the indirection code 1104/1106 is able to determine in which and how many memory pages the corresponding executable code 1112/1114 resides. Depending on the size of the executable code for any one function and the size of a memory page, one or more memory pages may be switched from "non-executable" to "executable" (or kept in the "executable" state) at any one time for a given function call. Additionally, in some implementations, only the memory region/page(s) where executable code corresponding to the most current, outstanding, and/or pending function call resides are kept in the "executable" state. In yet other implementations, to improve performance, the memory page(s) used in the last n function calls are kept in the "executable" memory state.

Figure 12:
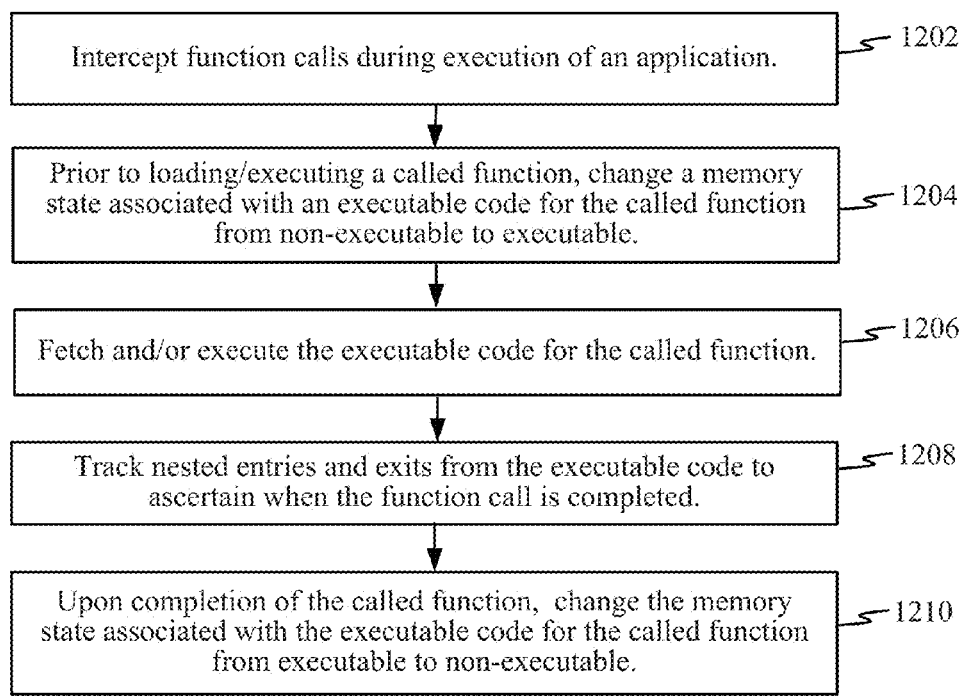
FIG. 12 illustrates a method for implementing an indirection layer that permits modifying the state of memory areas as they are needed or called.

FIG. 12 illustrates a method for implementing an indirection layer that permits modifying the state of memory areas as they are needed or called. This method may be implemented at the operating system level or at an application level. Function calls (e.g., calls to executable code in memory) may be intercepted during execution of an application 1202. Prior to loading/executing a called function, the indirection layer may change a memory state associated with an executable code for the called function from non-executable to executable 1204. The processing circuit may then fetch and/or execute the executable code for the called function 1206. According to one feature, the processing circuit may track nested entries and/or exits from the executable code to ascertain when the function call is completed 1208. Upon completion of the called function, the indirection layer may change the memory state associated with the executable code for the called function from executable to non-executable 1210.

Figure 13:
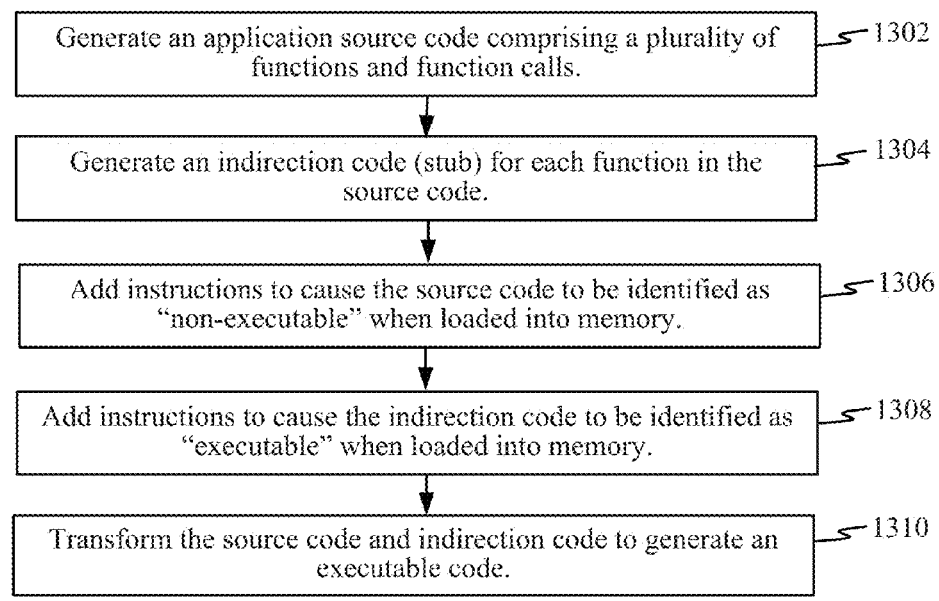
FIG. 13 illustrates a method for implementing an indirection layer within an application which allows modifying the state of memory areas where application executable code resides to protect access to such memory areas.

FIG. 13 illustrates a method for implementing an indirection layer within an application which allows modifying the state of memory areas where application executable code resides to protect access to such memory areas. An application source code, including a plurality of functions, may be generated 1302. An indirection code may also be generated for each function in the source code 1304. Instructions may be added to cause the source code to be identified as non-executable when loaded into memory 1306. Instructions may also be added to cause the indirection code to be identified as executable when loaded into memory 1308. The source code and indirection code may be transformed (e.g., compiled) at a processing circuit to generate an executable code 1310. The executable code may correspond to a single application and/or process. The indirection stub may be generated at a compiling stage or a pre-compiling stage of the executable code. The source code and indirection code may be compiled so that they reside in separate memory pages when loaded into memory for execution. For instance, a first indirection code associated with a first function is adapted to point to the first function, wherein when the executable code is generated, the first indirection code and first function are compiled to be loaded in different memory pages.

In one example, a first indirection code may cause a memory state indicator for a corresponding first function to be switched from a non-executable state to an executable state when the first function in invoked for execution.

In another example, a first indirection code causes a memory state indicator for a corresponding first function to be switched from an executable state to a non-executable state when the first function terminates execution.

In an exemplary implementation, one or more features disclosed in FIGS. 8, 9, 10, 12, and/or 13 may be implemented in parallel (e.g., concurrently), and/or in series (e.g., sequentially) in one or more processors. Where multiple processors execute one or more steps, each of the multiple processors may implement different steps, the same steps, and/or a subset of the steps.

In some of the exemplary implementations noted herein, the functions of the indirection layer may be implemented as distinct instructions/code that are added to an application before, during, and/or after compiling of the application. However, other implementations may reuse existing instructions in an instruction set and/or avoid switching between executable and non-executable states.

In another exemplary implementation, the "indirection layer" may be implemented as a set of two (or more) complementary instructions in the instruction set. For instance, the processor may be configured such that when the first instruction is executed, the processor rejects to fetch anything but the second instruction next. Such configuration may be done internally (e.g., hardwired into the processor) or by instructions loaded into the processor (e.g., loader configuration), for example. If the second instruction is what comes after execution of the first instruction, the processor continues execution. Otherwise, the processor may abort or reset execution. In this approach, setting a "non-executable" status for memory segments containing executable code may be optional and/or unnecessary. For instance, rather than having separate incoming/outgoing stubs 540 in FIG. 5, the function call instruction (i.e., first instruction) within the application is restricted to be followed only by the initial instruction of the called function (i.e., second instruction). If the processor notes that any other instruction than the initial instruction follows the function call instructions, it aborts execution. Such function call instruction (first instruction) and initial instruction (second instruction) may be new/special instructions added to an instruction set. Alternatively, ordinary instructions already part of an instruction set may be used for this purpose, but with a bit or marker may be used to note that the first instruction must be followed by the second instruction. This way, the processor may check for such instruction sequence and abort execution if anything other than the second instruction follows the first instruction (e.g., as would be the case in a return oriented attack).

In one example of such complementary instruction pairs, the first instruction may function as a "call" (e.g., to call a particular function) while the second instruction may function as a "land" which may be placed at function entries. In one instance, such instruction pair may be specifically defined within the instruction set to be complementary instructions, where the second instruction must follow the first instruction, otherwise the processor aborts execution. In one example, there may be two sets of such instructions, a first pair of instructions for initiating a function call (e.g., incoming stub) and a second pair of instructions for exiting/terminating a function call (e.g., outgoing stub).

In an alternative example, instead of using two dedicated instructions (e.g., complementary first and second instructions), ordinary instructions may be encoded or marked with a bit dedicated which is used to indicate whether they are a stub instruction or not. For instance, an ordinary first instruction (e.g., "call" instruction) may have a bit/marker set if it is used to load a function. Similarly, an ordinary second instruction (e.g., a "land" instruction) may have a similar bit/marker set if it is used as part of the function load. Thus, the processor may check such bit/marker when executing the first and/or second instructions to make sure that they are being executed in sequence, otherwise execution is aborted. Note that the first instruction (e.g., "call" instruction) may be various types of instructions, including a jump (JMP) instructions, a load instruction, etc. Similarly, in the reverse operation (e.g., when a function is completed), the first instruction may be various types of instructions, including a return instructions, an end instruction, etc.

Note that, in one example, the execution of the "call" instruction may cause the processor to automatically switch the state of a memory segment/page, where the called function resides, from a non-executable state to an executable state. Upon finishing execution of the called function, the operation is reversed and the memory segment/page is set back to the non-executable state. In an alternative embodiment, the memory segment/page is not marked as non-executable at all. Instead, return oriented programming attacks may be thwarted by the restriction that the function call instruction (first instruction) must be followed by the initial instruction of the called function (second instruction). This inhibits a return oriented programming attack from selectively jumping into a particular instruction in memory since the calling instructions is restricted to be followed by a landing instructions.

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning solutions.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

In the description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing embodiments described herein, is considered a special purpose processor for carrying out such embodiments. Similarly, a general-purpose computer is considered a special purpose computer when configured for carrying out embodiments described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a processing circuit, comprising:
    setting a state indicator for a first subset of a plurality of memory pages of executable code in a memory device to a non-executable state;
    setting the state indicator for a second subset of the plurality of memory pages to an executable state, where the second subset of the plurality of memory pages includes indirection stubs to functions in the first subset of the plurality of memory pages; and
    directing a function call for one of the functions in the first subset of the plurality of memory pages to a corresponding indirection stub in the second subset of the plurality of memory pages, wherein the corresponding indirection stub modifies the state indicator for the first subset of the plurality of memory pages prior to directing execution of the called function from the first subset of the plurality of memory pages.

2. The method of claim 1, wherein the executable code corresponds to a single application and/or process.

3. The method of claim 1, further comprising:
    loading the plurality of memory pages of executable code into the memory device after the state indicator for at least one of the first subset or second subset of the plurality of memory pages has been set to the non-executable state.

4. The method of claim 1, further comprising:
    loading the plurality of memory pages of executable code into the memory device before the state indicator for at least one of the first subset or second subset of the plurality of memory pages has been set to the non-executable state.

5. The method of claim 1, wherein the memory device into which the executable code resides implements a virtual memory.

6. The method of claim 1, further comprising:
performing execution prevention of executable code residing in the first subset of the plurality of memory pages.

7. The method of claim 6, wherein performing execution prevention includes:
aborting execution of any executable code which resides in a memory page that is in the non-executable state when the executable code is fetched by the processing circuit for execution.

8. The method of claim 1, wherein the corresponding indirection stub modifies the state indicator for the first subset of the plurality of memory pages from the non-executable state to the executable state to enable execution of the called function.

9. The method of claim 1, further comprising:
returning to the corresponding indirection stub in the second subset of the plurality of memory pages upon completion of the called function, where the corresponding indirection stub then modifies the state indicator for the first subset of the plurality of memory pages.

10. The method of claim 9, wherein the corresponding indirection stub modifies the state indicator for the first subset of the plurality of memory pages from the executable state to the non-executable state to disable execution of the called function.

11. The method of claim 1, further comprising:
flushing an internal cache memory of the processing circuit upon completion of the function call.

12. The method of claim 1, wherein the indirection stubs are generated at a compiling stage or pre-compiling stage of the executable code.

13. The method of claim 1, wherein the corresponding indirection stub includes at least a first instruction and a second instruction that are restricted to being executed in sequence by the processing circuit.

14. The method of claim 13, further comprising:
aborting execution of the function if the first instruction is followed by any instruction other than the second instruction.

15. The method of claim 13, wherein the first instruction is part of the function call and the second instruction an initial instruction of the called function.

16. The method of claim 15, wherein the corresponding indirection stub is implemented by binding the first instruction to the second instruction such that execution is aborted unless the first instruction is followed by the second instruction.

17. The method of claim 1, wherein code for the called function resides in a first memory page within the first subset of the plurality of memory pages, the method further comprising:
tracking usage of the first memory page that is in the executable state;
ascertaining when all ongoing function calls have completed execution of corresponding code within the first memory page; and
setting the state indicator for the first memory page to the non-executable state upon completion of a last ongoing function call.

18. A processing device, comprising:
a memory device; and
a processing circuit coupled to the memory device, the processing circuit configured to
set a state indicator for a first subset of a plurality of memory pages of executable code in the memory device to a non-executable state;
set the state indicator for a second subset of the plurality of memory pages to an executable state, where the second subset of the plurality of memory pages includes indirection stubs to functions in the first subset of the plurality of memory pages; and
direct a function call for one of the functions in the first subset of the plurality of memory pages to a corresponding indirection stub in the second subset of the plurality of memory pages, wherein the corresponding indirection stub modifies the state indicator for the first subset of the plurality of memory pages prior to directing execution of the called function from the first subset of the plurality of memory pages.

19. The processing device of claim 18, wherein the processing circuit is further configured to:
perform execution prevention of executable code residing in the first subset of the plurality of memory pages.

20. The processing device of claim 19, wherein performing execution prevention, the processing circuit is further configured
abort execution of any executable code which resides in a memory page that is in the non-executable state when the executable code is fetched by the processing circuit for execution.

21. The processing device of claim 18, wherein the corresponding indirection stub modifies the state indicator for the first subset of the plurality of memory pages from the non-executable state to the executable state to enable execution of the function.

22. The processing device of claim 18, wherein the processing circuit is further configured to:
return to the corresponding indirection stub in the second subset of the plurality of memory pages upon completion of the called function, where the corresponding indirection stub then modifies the state indicator for the first subset of the plurality of memory pages.

23. The processing device of claim 18, wherein the corresponding indirection stub modifies the state indicator for the first subset of the plurality of memory pages from the executable state to the non-executable state to disable execution of the function.

24. The processing device of claim 18, wherein the corresponding indirection stub includes at least a first instruction and a second instruction that are restricted to being executed in sequence by the processing circuit, wherein the processing circuit is further configured to:
abort execution of the function call if the first instruction is followed by any instruction other than the second instruction.

25. A processing device, comprising:
means for loading a plurality of memory pages of executable code into a memory device;
means for setting a state indicator for a first subset of the plurality of memory pages to a non-executable state;
means for setting the state indicator for a second subset of the plurality of memory pages to an executable state, where the second subset of the plurality of memory pages includes indirection stubs to functions in the first subset of the plurality of memory pages; and
means for directing a function call for one of the functions in the first subset of the plurality of memory pages to a corresponding indirection stub in the second subset of the plurality of memory pages, wherein the corresponding indirection stub modifies the state indicator for the first subset of the plurality of memory pages prior to directing execution of the called function from the first subset of the plurality of memory pages.

26. A non-transitory processor-readable medium having instructions stored thereon, which when executed by at least one processor causes the at least one processor to:
   set a state indicator for a first subset of a plurality of memory pages of executable code in a memory device to a non-executable state;
   set the state indicator for a second subset of the plurality of memory pages to an executable state, where the second subset of the plurality of memory pages includes indirection stubs to functions in the first subset of the plurality of memory pages; and
   direct a function call for one of the functions in the first subset of the plurality of memory pages to a corresponding indirection stub in the second subset of the plurality of memory pages, wherein the corresponding indirection stub modifies the state indicator for the first subset of the plurality of memory pages prior to directing execution of the called function from the first subset of the plurality of memory pages.

27. A method operational in a processing circuit, comprising:
   generating an application source code including a plurality of functions;
   generating an indirection code for each function in the source code;
   adding instructions to cause the source code to be identified as non-executable when loaded into memory;
   adding instructions to cause the indirection code to be identified as executable when loaded into memory; and
   transforming the source code and indirection code at the processing circuit to generate an executable code.

28. The method of claim 27, wherein the executable code corresponds to a single application and/or process.

29. The method of claim 27, wherein the indirection code is generated at a compiling stage or a pre-compiling stage of the executable code.

30. The method of claim 27, wherein the source code and indirection code are compiled so that they reside in separate memory pages when loaded into memory.

31. The method of claim 27, wherein a first indirection code causes a memory state indicator for a corresponding first function to be switched from a non-executable state to an executable state when the first function in invoked for execution.

32. The method of claim 27, wherein a first indirection code causes a memory state indicator for a corresponding first function to be switched from an executable state to a non-executable state when the first function terminates execution.

33. The method of claim 27, wherein a first indirection code associated with a first function points to the first function, wherein when the executable code is generated, the first indirection code and first function are compiled to be loaded in different memory pages.

34. The method of claim 27, wherein the indirection code includes at least a first instruction and a second instruction that is restricted to being executed in sequence by a processing circuit.

35. The method of claim 34, further comprising:
   adding instructions to cause aborting of execution of the indirection code if the first instruction is followed by any instruction other than the second instruction.

36. A non-transitory processor-readable medium having instructions stored thereon, which when executed by at least one processor causes the at least one processor to:
   generate an application source code including a plurality of functions;
   generate an indirection code for each function in the source code;
   add instructions to cause the source code to be identified as non-executable when loaded into memory;
   add instructions to cause the indirection code to be identified as executable when loaded into memory; and
   transform the source code and indirection code at the processing circuit to generate an executable code.

37. The non-transitory processor-readable medium of claim 36, wherein the executable code corresponds to a single application and/or process.

38. The non-transitory processor-readable medium of claim 36, wherein the indirection code is generated at a compiling stage or a pre-compiling stage of the executable code.

39. The non-transitory processor-readable medium of claim 36, wherein a first indirection code causes a memory state indicator for a corresponding first function to be switched from a non-executable state to an executable state when the first function in invoked for execution.

40. The non-transitory processor-readable medium of claim 36, wherein a first indirection code causes a memory state indicator for a corresponding first function to be switched from an executable state to a non-executable state when the first function terminates execution.

* * * * *